United States Patent
Murai et al.

(10) Patent No.: US 10,663,306 B2
(45) Date of Patent: May 26, 2020

(54) NAVIGATION SYSTEM

(71) Applicant: TOYOTA JIDOSHA KABUSHIKI KAISHA, Toyota-shi, Aichi-ken (JP)

(72) Inventors: Rie Murai, Tokyo (JP); Keiko Suzuki, Tokyo (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 478 days.

(21) Appl. No.: 15/323,533

(22) PCT Filed: Jun. 16, 2015

(86) PCT No.: PCT/JP2015/067334
§ 371 (c)(1),
(2) Date: Jan. 3, 2017

(87) PCT Pub. No.: WO2016/006395
PCT Pub. Date: Jan. 14, 2016

(65) Prior Publication Data
US 2017/0138748 A1    May 18, 2017

(30) Foreign Application Priority Data

Jul. 8, 2014   (JP) .................. 2014-140677

(51) Int. Cl.
*G01C 21/34*   (2006.01)
*G09B 29/10*   (2006.01)
*G01C 21/36*   (2006.01)
*G01S 19/42*   (2010.01)

(52) U.S. Cl.
CPC ....... *G01C 21/3415* (2013.01); *G01C 21/367* (2013.01); *G01S 19/42* (2013.01); *G09B 29/10* (2013.01)

(58) Field of Classification Search
None
See application file for complete search history.

(56) References Cited

U.S. PATENT DOCUMENTS

| 5,793,631 A * | 8/1998 | Ito ................ B60R 16/0373 701/431 |
| 8,805,611 B2 * | 8/2014 | Damon ............ G01C 21/3626 701/412 |
| 2008/0027640 A1 | 1/2008 | Kashalkar |
| 2009/0187342 A1 * | 7/2009 | Vavrus .................. G01C 21/32 701/414 |

(Continued)

FOREIGN PATENT DOCUMENTS

| JP | 2002-107169 | 4/2002 |
| JP | 2005-221285 | 8/2005 |

(Continued)

*Primary Examiner* — David P. Mertino
(74) *Attorney, Agent, or Firm* — Finnegan, Henderson, Farabow, Garrett & Dunner, LLP

(57) ABSTRACT

A navigation system which performs route guidance from a vehicle departure location to a target location. After a vehicle has arrived at the target location and completed the route guidance, if the vehicle has moved away from the target location and thereafter has approached the target location again, the navigation system: determines that the vehicle is disorientated and unable to arrive at the target location; and resumes the route guidance.

12 Claims, 8 Drawing Sheets

(56) References Cited

U.S. PATENT DOCUMENTS

| | | | | |
|---|---|---|---|---|
| 2012/0303262 A1* | 11/2012 | Alam | ................ | G01C 21/3415 |
| | | | | 701/410 |
| 2015/0019126 A1* | 1/2015 | Kozloski | ............ | G01C 21/3415 |
| | | | | 701/412 |

FOREIGN PATENT DOCUMENTS

| | | |
|---|---|---|
| JP | 2006-58026 | 3/2006 |
| JP | 2012-202894 | 10/2012 |

* cited by examiner

NAVIGATION SYSTEM

CROSS-REFERENCE TO RELATED APPLICATIONS

This application is a national phase application of International Application No. PCT/JP2015/067334, filed Jun. 16, 2015, and claims the priority of Japanese Application No. 2014-140677, filed Jul. 8, 2014, the content of both of which is incorporated herein by reference.

TECHNICAL FIELD

The present invention relates to a navigation system that performs route guidance for a vehicle from a departure point to a destination point.

BACKGROUND ART

A known navigation device installed in a vehicle performs route guidance from a departure point to a destination point using voice, images, and the like. Such a navigation device is described in, for example, patent document 1. If a vehicle is still traveling after a predetermined time elapses from when the vehicle has reached the vicinity of a destination point and route guidance has ended, the navigation device determines that the vehicle has not reached the destination point and has become lost. Thus, the navigation device restarts the route guidance.

PRIOR ART DOCUMENT

Patent Document

Patent Document 1: Japanese Laid-Open Patent Publication No. 2006-58026

SUMMARY OF THE INVENTION

Problems that are to be Solved by the Invention

Even when the vehicle continues to travel for a predetermined time or longer after the route guidance ends, this does not necessarily mean that the vehicle has not reached the destination point and has become lost. For example, the lost conditions may be satisfied if the destination point is a large facility when, after reaching the destination point, the vehicle is in a line of vehicles and traveling slowly to find a place to park. The lost conditions may also be satisfied when, after reaching the destination point, the vehicle continues to travel to find a parking lot near the destination point. In this manner, when erroneously determined that the vehicle has become lost, unnecessary route guidance is restarted. This may be annoying to the driver.

It is an object of the present invention to provide a navigation system that is capable of determining more accurately, after ending route guidance, whether or not a vehicle is lost and cannot reach a destination point when restarting route guidance.

Means for Solving the Problem

The means for solving the above problem and the advantages of the means will now be described.

To achieve the above object, a navigation system according to one aspect of the present invention performs route guidance from a departure point to a destination point of a vehicle. The navigation system is configured so that after the vehicle reaches the destination point and the route guidance ends, when the vehicle moves away from the destination point and then moves toward the destination point again, the navigation system determines that the vehicle has not reached the destination point and has become lost and restarts the route guidance.

Generally, it is assumed that a vehicle has not reached the destination point when the vehicle moves away from the destination point although the vehicle has once reached the destination point. Further, it is assumed that the vehicle has not changed the destination point or the like and is continuing to travel toward the destination point when the vehicle moves away from the destination point and then moves toward the destination point. In the above structure, after the vehicle reaches the destination point and route guidance ends, when the vehicle moves away from the destination point and then moves toward the destination point again, the navigation system restarts route guidance by determining that the vehicle has not reached the destination point and has become lost. That is, when the vehicle reaches the destination point and the route guidance ends, if the vehicle is traveling in a pattern in which the vehicle moves away from the destination point and then moves toward the destination point again, this indicates that the vehicle is still continuing to travel toward the destination point and the destination point has not changed as described above. Thus, there is a high probability that the vehicle has not reached the destination point and is lost. Thus, after route guidance ends, the navigation system restarts the route guidance by determining more accurately that the vehicle cannot reach the destination point and is lost based on the traveling pattern of the vehicle. The destination point may refer to the location of a certain facility or the location of the vicinity of the facility.

In the navigation system, it is preferred that the lost determination be performed on the condition that the vehicle reaches a point separated from the destination point by a predetermined first distance and then reaches a point separated from the destination point by a predetermined second distance, which is shorter than the first distance.

In the above structure, the determination of whether or not the vehicle is lost only needs to monitor that the vehicle has moved away from the destination point beyond the first distance and that the vehicle has returned to the range within the second distance from the destination point. Thus, such a determination is easily performed.

In the navigation system, it is preferred that the lost determination be performed on the condition that after reaching a point separated from the destination point by a predetermined first distance, the vehicle returns toward the destination point and then moves toward the destination point from the returning point by a predetermined third distance.

In the above structure, even if the vehicle has been moved away from the destination point by the first distance, when the vehicle is returned toward the destination point and is moved by the third distance toward the destination point from the returning point, the navigation system determines that the vehicle has not reached the destination point and is lost. Thus, it is determined that the vehicle is lost when the vehicle is still located far from the destination point even if the vehicle is returned from a point far from the destination point and is moved by the third distance toward the destination point from the returning point.

In the navigation system, it is preferred that the first distance be extended when a vicinity of the destination point includes a road with a traffic restriction.

When a road where traffic is restricted, such as a one-way road or a road under construction, is included in the vicinity of the destination point, it may be difficult for the vehicle to travel. That is, when the vehicle has once passed by the destination point, the vehicle may have to greatly detour the destination point. In the above structure, when the vicinity of the destination point includes a traffic-restricted road, after the vehicle reaches the destination point, a target distance by which the vehicle is separated from the destination point, that is, the first distance, is set to be long. This reduces the possibility of an erroneous determination for the lost determination.

In the navigation system, it is preferred that the first distance be set to be long when the destination point is a facility including a parking lot that requires the vehicle to further travel from the destination point for a predetermined distance or longer.

When the location of the facility that is the destination point is far from the location of the parking lot or when the area of the parking lot is large though the parking lot is located next to the facility, the vehicle may have to travel for a long distance from the destination point to the parking lot even when the vehicle reaches the destination point in accordance with the route guidance. In the above structure, when the vehicle needs to travel for a predetermined distance or longer from a facility that is the destination point to a parking lot of the facility, after the vehicle reaches the destination point, a target distance by which the vehicle is separated from the destination point, that is, the first distance, is set to be long. This reduces the possibility of an erroneous lost determination.

In the navigation system, it is preferred that the vehicle further include a display unit that is capable of separately displaying route guidance information in multiple screens, and when the lost determination is repeated, detailed information related to a vicinity of the destination point be displayed together with the route guide information on the display unit.

When the lost determination is repeated, the destination point may be an environment that is difficult for the driver of the vehicle to recognize, for example, a road environment where the vicinity of the destination point is complicated. In such a situation, the above structure displays on the monitor the detailed information of the vicinity of the destination point by, for example, setting a two-screen display of map information and image information. Thus, even when the driver of the vehicle does not recognize the destination point and is lost, guidance to the destination point is further performed effectively.

It is preferred that the navigation system include a location information obtaining unit that obtains current location information of the vehicle, a destination point setting unit that sets location information corresponding to a destination point of the vehicle, and a lost determination traveling unit that calculates a distance from the current location of the vehicle obtained by the location information obtaining unit to a location of the destination point set by the destination point setting unit and determines whether or not the vehicle has not reached the destination point and is lost based on a value of the calculated distance. The lost traveling determination unit is arranged in a management center that manages traveling information of subject vehicles through wireless communication. The lost traveling determination unit restarts route guidance for the vehicle that has been determined as being lost.

In the above structure, when adding a vehicle that is subject to the determination of whether or not the vehicle has not reached the destination point and is lost, it is only necessary to add a vehicle that does not include such a determination function as a management function of the management center. This increases the flexibility and versatility when applying such a navigation system to a plurality of vehicles.

It is preferred that the navigation system include a location information obtaining unit that obtains current location information of the vehicle, a destination point setting unit that sets location information corresponding to a destination point of the vehicle, and a lost determination traveling unit that calculates a distance from the current location of the vehicle obtained by the location information obtaining unit to a location of the destination point set by the destination point setting unit and determines whether or not the vehicle has not reached the destination point and is lost based on a value of the calculated distance. The lost traveling determination unit is arranged in the vehicle, and the lost traveling determination unit restarts route guidance for the corresponding vehicle that has been determined as being lost.

In the above structure, since the vehicle has the function to determine whether the vehicle has not reached the destination point and is lost, the determination does not require communication or the like between the vehicle and an external device. Accordingly, although a load on the in-vehicle device increases, the determination is stably performed independently from the communication environment between the vehicle and an external device.

EMBODIMENTS OF THE INVENTION

First Embodiment

A first embodiment of a navigation system will now be described with reference to the drawings.

Figure 1:
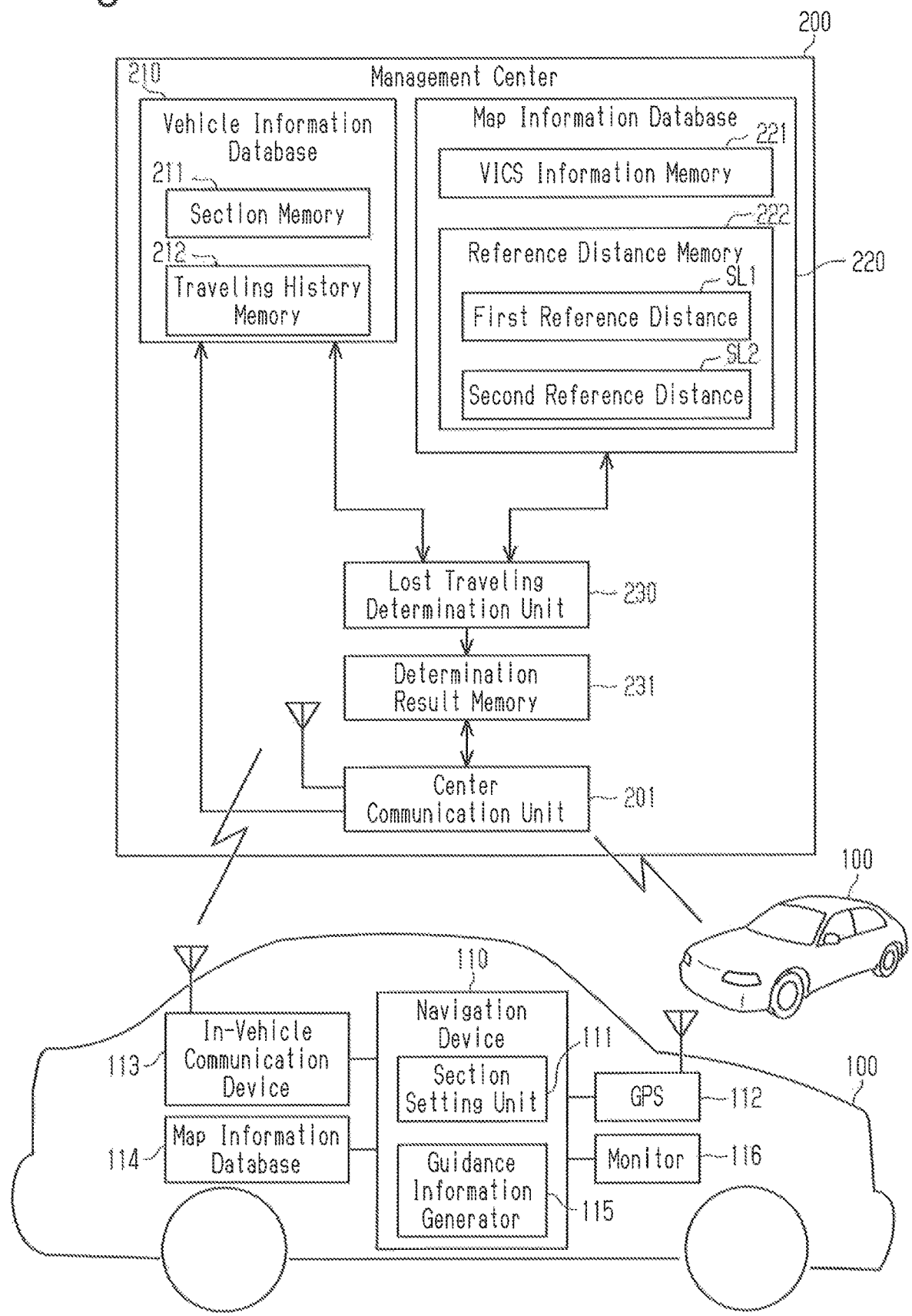
FIG. 1 is a schematic block diagram showing the configuration of a navigation system according to a first embodiment of the present invention.

As shown in FIG. 1, the navigation system of the first embodiment performs a lost determination for vehicles 100 when performing route guidance from a departure point to a destination point. The navigation system enables wireless transmission and reception of various types of information between the vehicles 100 and a management center 200. The location information of a current point and a destination point of each of the vehicles 100 is transmitted through wireless communication from the vehicle 100 to the management center 200. The information of a determination result of whether or not a vehicle 100 has not reached the set destination point and is lost is transmitted through wireless communication from the management center 200 to the vehicle 100.

Each vehicle 100 includes a navigation device 110 that functions in the navigation system to perform route guidance for the vehicle 100. The navigation device 110 includes a section setting unit 111 that sets a section between a departure point and a destination point of the vehicle 100 as a traveling section of the vehicle 100. Further, the navigation device 110 includes a global positioning system 112 (GPS) that obtains the location information of a current point of the vehicle 100, which is the current location information of the vehicle 100. The navigation device 110 sets, as the location information of the departure point of the vehicle 100, the location information of the current point obtained from the GPS 112 when setting the traveling section of the vehicle 100. In addition, the navigation device 110 transmits through wireless communication the information of the traveling section of the vehicle 100, which is set by the section setting unit 111, to the management center 200 via an in-vehicle communication device 113, which is installed in the vehicle 100.

Further, the navigation device 110 includes a map information database 114 that registers map information. The map information includes information that indicates latitudes and longitudes of, for example, curves, intersections, one-way roads, stop sign locations, railroad crossings, traffic lights, facilities, and parking lots of facilities. The navigation device 110 searches for the optimal route of a traveling section of the vehicle 100 using the Dijkstra's algorithm or the like while referring to the map information registered in the map information database 114. Further, the navigation device 110 generates guidance information of the searched optimal route with a guidance information generator 115. Then, the navigation device 110 outputs the generated guidance information to a monitor 116 and displays the generated guidance information on the monitor 116 (display unit).

The management center 200 manages traveling information of the vehicles 100 and includes a center communication unit 201 that receives various types of information from the vehicles 100. The center communication unit 201 stores the various types of information received from the vehicles 100 in a vehicle information database 210 for each vehicle based on a vehicle ID included in the received information. The various types of information include the traveling section and the traveling history of each vehicle 100. More specifically, the traveling history of the vehicle 100 includes the current location of the vehicle 100, the traveling time and the traveling distance from when the vehicle 100 has reached a destination point, and the like.

When receiving information of the traveling section from the vehicle 100, the center communication unit 201 stores the information of the traveling section in a section memory 211 of the vehicle information database 210. In the same manner, when receiving information of the traveling history from the vehicle 100, the center communication unit 201 stores the information of the traveling history in a traveling history memory 212 of the vehicle information database 210.

Further, the management center 200 includes a map information database 220 that registers map information. In the same manner as the map information registered in the map information database 114 of the vehicle 100, the map information registered in the map information database 220 includes information that indicates the latitudes and longitudes of, for example, curves, intersections, one-way roads, stop sign locations, railroad crossings, traffic lights, facilities, and parking lots of facilities.

In addition, the management center 200 is capable of obtaining Vehicle Information and Communication System (VICS) (registered trademark) information from a VICS center. The VICS information includes information related to temporary traffic restrictions. The map information database 220 includes a VICS information memory 221. The latest information of the temporary traffic restrictions obtained from the VICS center is occasionally written to and updated in the VICS information memory 221.

Further, the map information database 220 includes a reference distance memory 222 that stores a predetermined first reference distance SL1 and a predetermined second reference distance SL2. Each of the reference distances SL1 and SL1 is a reference value of a determination threshold used to determine whether or not the vehicle 100 has not reached a destination point and is lost. In this embodiment, the determination threshold is specified by the direct distance from a destination point on the map, and the reference distances SL1 and SL2 are each specified by the direct distance from a destination point on the map in the same manner. Further, in this embodiment, the first reference distance SL1 is longer than the second reference distance SL2.

In addition, the management center 200 includes a lost traveling determination unit 230 that functions in the navigation system to determine whether or not the vehicle 100 is lost. The lost traveling determination unit 230 reads the location information of a destination point of the vehicle 100 from the section memory 211 of the vehicle information database 210 and reads the location information of a current point of the vehicle 100 from the traveling history memory 212 of the vehicle information database 210. Further, the lost traveling determination unit 230 reads the first reference distance SL1 and the second reference distance SL2 from the reference distance memory 222 of the map information database 220. The lost traveling determination unit 230 normally sets the first reference distance SL1 as a first distance, which serves as a determination threshold, and sets the second reference distance SL2 as a second distance, which serves as a shorter determination threshold than the first distance.

The lost traveling determination unit 230 determines that the vehicle 100 has become lost after the vehicle 100 has reached a destination point. More specifically, the lost traveling determination unit 230 determines that the vehicle 100 has become lost when, after reaching a destination point, the vehicle 100 moves away to a point separated from the destination point by the first distance and then moves again toward the destination point to a point separated from the destination point by the second distance. This is because the lost traveling determination unit 230 assumes that the vehicle 100 has not reached the destination point when the vehicle 100 reaches a point separated from the destination point by the first distance although the vehicle 100 has once reached the destination point. Further, the lost traveling determination unit 230 assumes that the vehicle 100 has not changed the destination point or the like and is continuing to travel toward the destination point when the vehicle 100 reaches the point separated from the destination point by the first distance and then reaches the point separated from the destination point by the second distance. In this case, the lost traveling determination unit 230 determines whether or not the vehicle 100 has moved away from the destination point by the first distance based on whether or not the current point of the vehicle 100 is located within the first distance from the destination point. Further, the lost traveling determination unit 230 determines whether or not the vehicle 100 has again moved away from the destination point by the second distance based on whether or not the current point of the vehicle 100 is located within a range of the second distance from the destination point. The lost traveling determination unit 230 performs the above determination process on the condition that the traveling time and the traveling distance from when the vehicle 100 has reached the destination point have not reached the range set as a timeout condition.

When determining that the vehicle 100 has become lost, the lost traveling determination unit 230 stores the determination result for each vehicle in the determination result memory 231, for example, sets on flag information corresponding to a vehicle ID of the vehicle 100.

The management center 200 reads the determination result corresponding to the vehicle 100 from the determination result memory 231. Then, when determining that the vehicle 100 has become lost, the management center 200 transmits the determination result through wireless communication to the vehicle 100 via the center communication unit 201. When the vehicle 100 receives the determination result from, the management center 200 via the in-vehicle communication device 113, even if the vehicle 100 has reached a destination point and already ended route guidance, the vehicle 100 restarts the route guidance to the destination point.

The operation of the navigation system of the first embodiment will now be described. The description focuses on the operation for determining whether or not the vehicle 100 is lost. In the following description, transmission and reception of information is cyclically performed between the management center 200 and the vehicles 100 using the management center 200 as a main unit (master).

Figure 2:
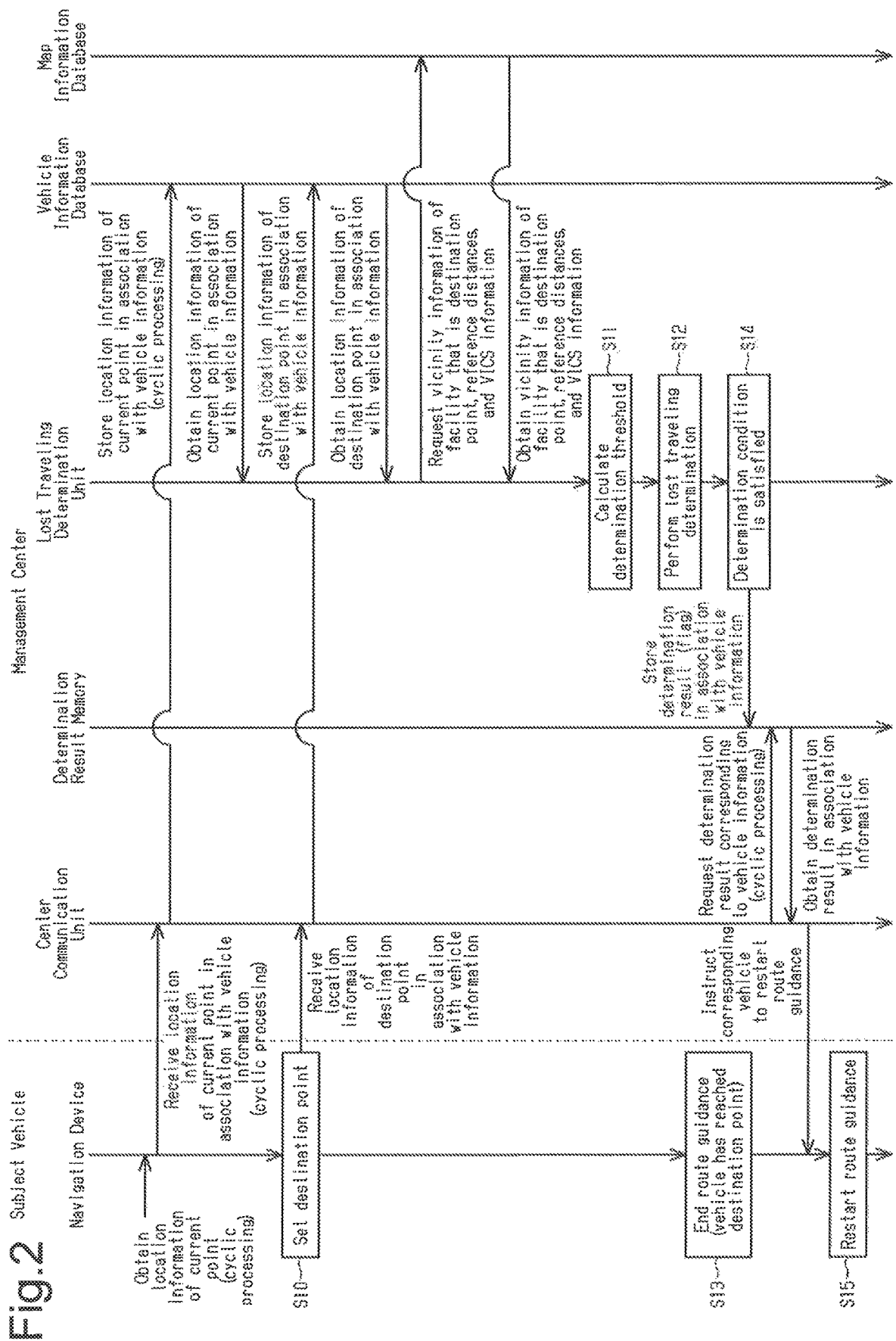
FIG. 2 is a sequence chart showing the flow of information when the navigation system of FIG. 1 performs a lost determination process.

As shown in FIG. 2, the navigation device 110 cyclically obtains the location information of the current point of the vehicle 100. The obtained location information is transmitted through wireless communication from the vehicle 100 to the center communication unit 201 of the management center 200. Further, the center communication unit 201 stores the received location information of the current point in the vehicle information database 210 in association with the vehicle information. The location information of the current point of the vehicle 100 stored in the vehicle information database 210 is cyclically updated with the latest information that is transmitted through wireless communication from the vehicle 100. When the location information of the current point of the vehicle 100 stored in the vehicle information database 210 is updated, the updated latest information is associated with the vehicle information and output from the vehicle information database 210 to the lost traveling determination unit 230.

When a destination point of the vehicle 100 is set by the navigation device 110 (step S10), the location information of the set destination point is transmitted through wireless communication from the vehicle 100 to the center communication unit 201 of the management center 200. The center communication unit 201 stores the received location information of the destination point in the vehicle information database 210 in association with the vehicle information. When the location information of the destination point of the vehicle 100 is stored in the vehicle information database 210, the stored location information of the destination point is associated with the vehicle information and output from the vehicle information database 210 to the lost traveling determination unit 230.

When obtaining the location information of the destination point of the vehicle 100, the lost traveling determination unit 230 accesses the map information database 220 and obtains VICS information from the map information database 220. The VICS information includes vicinity information of the facility that is the destination point, information of the first reference distance SL1 and the second reference distance SL2, and information related to temporary traffic restrictions in the vicinity of the facility that is the destination point. In this case, the vicinity information of the facility that is the destination point includes information of whether or not one-way roads are included in the vicinity of the destination point, information related to the distance from the facility that is the destination point to a parking lot of the facility, and the like. The lost traveling determination unit 230 calculates the above determination threshold based on the obtained information (step S11).

Subsequently, the lost traveling determination unit 230 determines whether or not the vehicle 100 is lost using the calculated determination threshold and the information of the current point and destination point of the vehicle 100 (step S12). When the vehicle 100 reaches a destination point G while the lost traveling determination unit 230 is performing the determination process, route guidance for the vehicle 100 performed by the navigation device 110 is ended (step 313).

Figure 3:
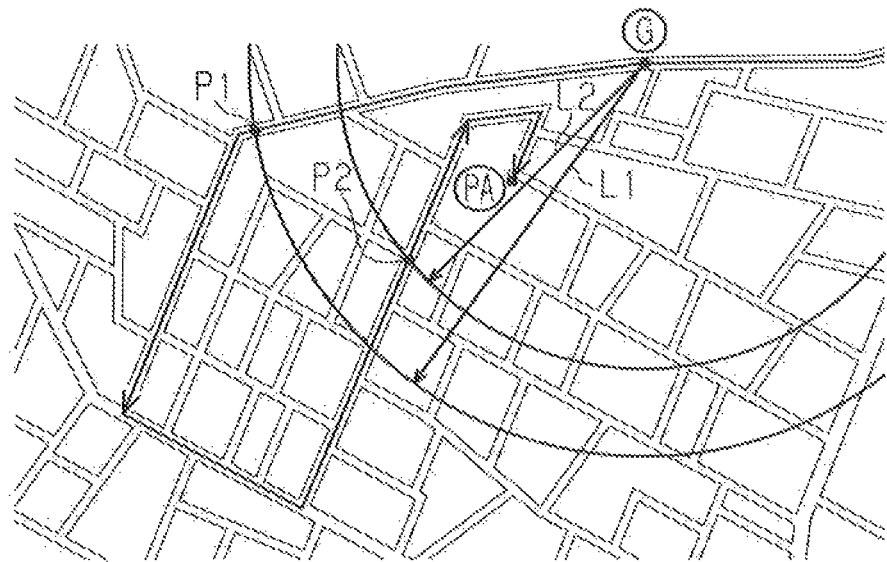
FIG. 3 is a schematic view showing an example of a detour route of a vehicle near a destination point.

More specifically, in the example shown in FIG. 3, although the vehicle 100 has once reached the destination point G, the vehicle further travels to point P1 that is separated from the destination point G by the first distance L1. The lost traveling determination unit 230 accordingly determines that the vehicle 100 has not reached the destination point. As the vehicle 100 moves from, point P1 farther away from the destination point G and then returns toward the destination point G, the vehicle 100 subsequently reaches point P2 that is separated from the destination point G by the second distance L2 while moving toward the destination point G. The lost traveling determination unit 230 accordingly determines that the vehicle 100 has not changed the destination point and is still continuing to travel toward the destination point. In such a case, the lost traveling determination unit 230 determines that the vehicle 100 is lost since the vehicle 100 has reached a point separated from the destination point by the first distance and then reached a point separated from the destination point by the second distance. In this example, the vehicle 100 subsequently travels to a parking lot PA of the facility of the destination point G while traveling from point P2 toward the destination point G.

Figure 4:
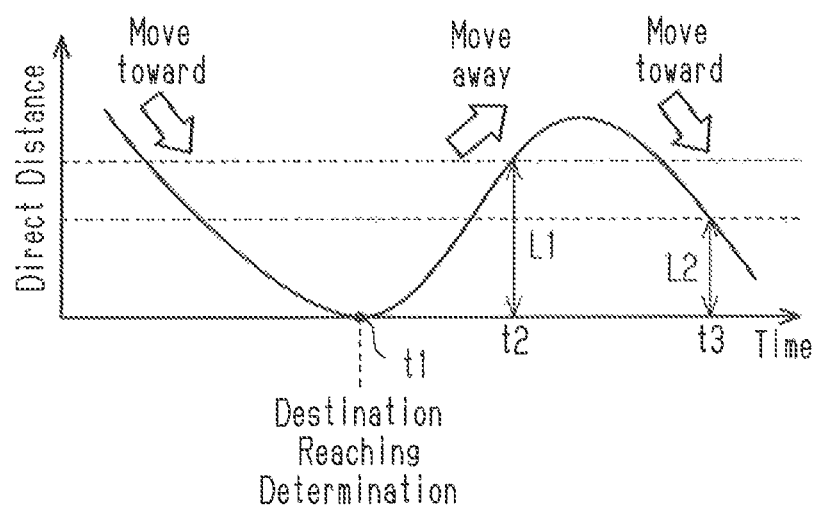
FIG. 4 is a graph showing an example of a condition for a lost determination for the vehicle that is detouring the vicinity of the destination point.

FIG. 4 shows an example of a condition for the lost determination in correspondence with the transition of the distance between the current point and the destination point of the vehicle 100 in the example of FIG. 3. As shown in FIG. 4, when the vehicle 100 reaches the destination point G at time t1, the lost traveling determination unit 230 monitors whether or not the vehicle 100 travels to a point separated from the destination point G by the first distance L1. At time t2, when the vehicle 100 travels to point P1 separated from the destination point G by the first distance L1, the lost traveling determination unit 230 monitors whether or not the vehicle 100 returns to a point separated from the destination point G by the second distance L2. Subsequently, when the vehicle 100 travels to a point separated from the destination point G by the second distance L2 at time t3, the lost traveling determination unit 230 determines that the vehicle 100 is lost.

As shown in FIG. 2, when the lost traveling determination unit 230 determines that the vehicle 100 is lost, that is, the determination condition is satisfied (step S14), the determination result (flag) is stored in the determination result memory 231 in association with the vehicle information. The center communication unit 201 cyclically accesses the determination result memory 231 to acknowledge whether or not the determination result associated with the vehicle information of a transmission source exists. When the corresponding determination result exists, the center communication unit 201 transmits through wireless communication the determination result to the navigation device 110 of the vehicle 100 that is determined as being lost. Then, when receiving the determination result from the center communication unit 201, the navigation device 110 restarts route guidance to the destination point even if route guidance was ended when the vehicle 100 reached the destination point (step S15).

In the first embodiment, when a road where traffic is restricted such as a one-way road is included in the vicinity of the destination point, as an exception, a distance that is longer than the first reference distance SL1 is set as the first distance. This is because when a traffic-restricted road is included in the vicinity of the destination point, the vehicle 100 will have to greatly detour the destination point G even when the driver correctly recognizes the destination point.

Figure 5A:
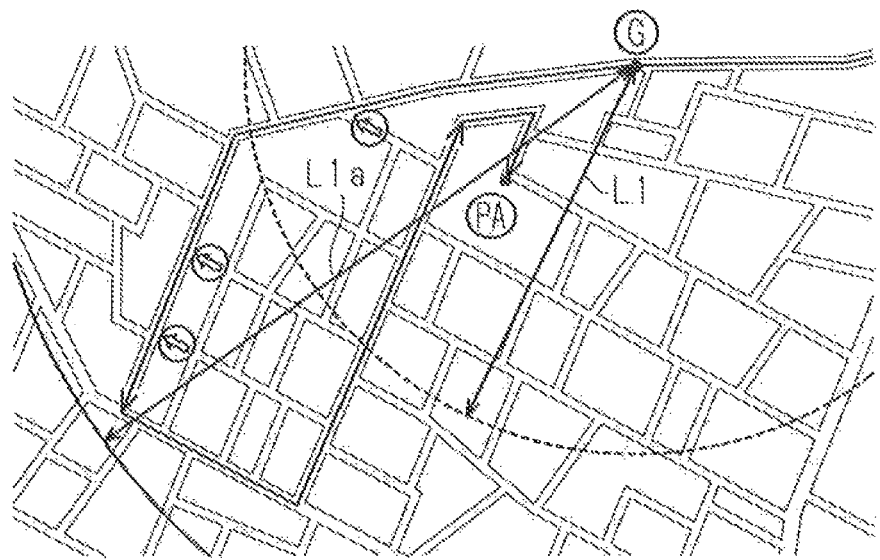
FIG. 5A is a schematic view showing an example of a first distance setting mode when a one-way road is included in the vicinity of the destination point.

For example, in the example of FIG. 3, a one-way road is not included in the vicinity of the destination point G. Thus, the first reference distance SL1 is set as the first distance L1. In the example of FIG. 5A, a one-way road is included in the vicinity of the destination point G. Thus, a distance longer than the first reference distance SL1 is set as a first distance L1a.

Further, when a read where a temporary traffic restriction is imposed such as a road under construction is included in the vicinity of the destination point, as an exception, a distance longer than the first reference distance SL1 is set as the first distance. This is because when a temporarily traffic-restricted road is included in the vicinity of the destination point, it will be difficult for the vehicle 100 to travel on the temporarily traffic-restricted road, and the vehicle 100 may have to greatly detour the destination point G.

Figure 5B:
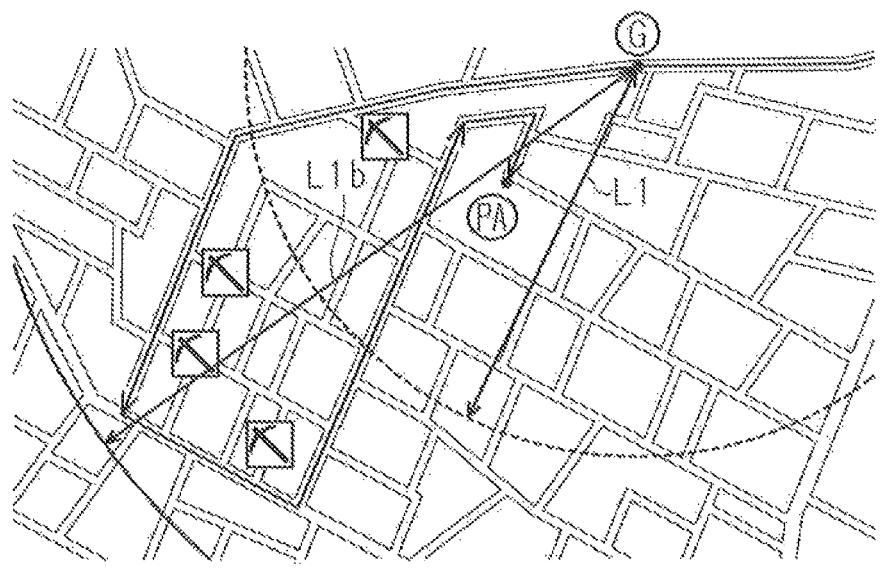
FIG. 5B is a schematic view showing an example of the first distance setting mode when a road under construction is included in the vicinity of the destination point.

For example, in the example of FIG. 3, a road under construction is not included in the vicinity of the destination point G. Thus, the first reference distance SL1 is set as the first distance L1. In the example of FIG. 5B, a road under construction is included in the vicinity of the destination point G. Thus, a distance longer than the first reference distance SL1 is set as a first distance L1b.

In addition, when the destination point is a facility including a parking lot that requires the vehicle to further travel from the destination point for a predetermined distance or longer, as an exception, a distance that is longer than the first reference distance SL1 is set as the first distance. This is because when the location of the facility that is the destination point is far from the location of the parking lot or when the area of the parking lot is large though the parking lot is located next to the facility, the vehicle 100 may have to travel for a long distance from the destination point to the parking lot even when the vehicle 100 reaches the destination point in accordance with the route guidance.

Figure 5C:
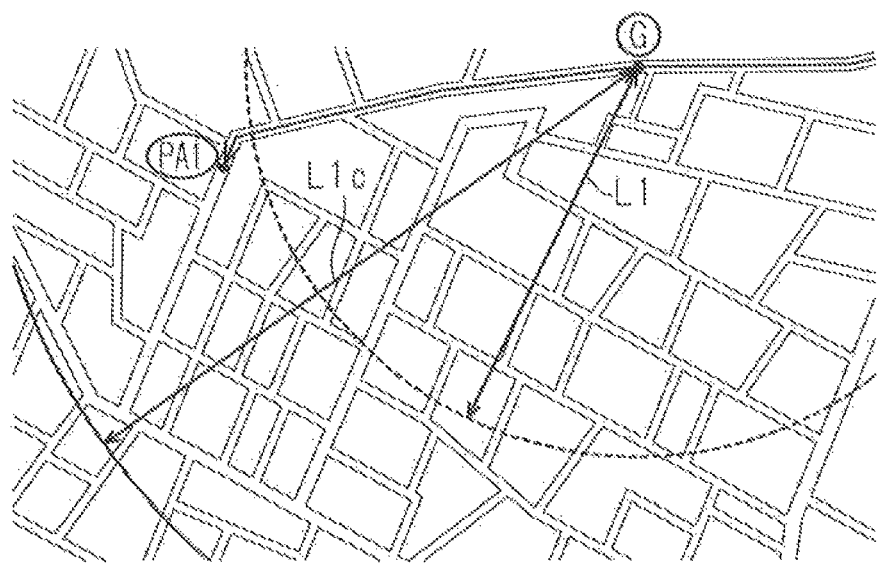
FIG. 5C is a schematic view showing an example of the first distance setting mode when the location of a facility that is the destination point is far from the location of a parking lot of the facility.

For example, in the example of FIG. 3, the location of the facility that is the destination point G is close to the location of the parking lot PA. Thus, the first reference distance SL1 is set as the first distance L1. In the example of FIG. 5C, the location of the facility that is the destination point G is far from the location of the parking lot PA. Thus, a distance longer than the first reference distance SL1 is set as a first distance L1c.

The first embodiment has the advantages described below.

(1) After the vehicle 100 reaches the destination point G and route guidance ends, when the vehicle 100 moves away from the destination point G and then moves toward the destination point G again, the lost traveling determination unit 230 restarts route guidance by determining that the vehicle 100 has not reached the destination point and has become lost. That is, when the vehicle 100 reaches the destination point G and the route guidance ends, if the vehicle 100 is traveling in a pattern in which the vehicle 100 moves away from the destination point G and then moves toward the destination point G again, this indicates that the vehicle 100 is still continuing to travel toward the destination point G and the destination point G has not changed. Thus, there is a high probability that the vehicle 100 has not reached the destination point G and is lost. Thus, after route guidance ends, the lost traveling determination unit 230 restarts the route guidance by determining more accurately that the vehicle 100 cannot reach the destination point G and is lost based on the traveling pattern of the vehicle 100.

(2) The lost traveling determination unit 230 determines that the vehicle 100 has not reached the destination point G and is lost on the condition that the vehicle 100 has reached a point separated from the destination point G by the first distance L1 (or L1a, L1b, or L1c) and then reaches a point separated from the destination point G by the second distance L2, which is shorter than the first distance L1 (or L1a, L1b, or L1c). Since the lost traveling determination unit 230 only needs to monitor that the vehicle 100 has moved away from the destination point G beyond the first distance L1 (or L1a, L1b, or L1c) and that the vehicle 100 has returned to the range within the second distance L2 from the destination point G, the lost traveling determination unit 230 easily performs the above determination.

(3) When the vicinity of the destination point G includes a traffic-restricted road, after the vehicle 100 reaches the destination point G, the lost traveling determination unit 230 sets a target distance by which the vehicle 100 is separated from the destination point G, that is, the first distance L1a or L1*b*, to be longer than the normal distance L1. This reduces the possibility of an erroneous determination for the lost determination.

(4) When the vehicle 100 needs to travel for a predetermined distance or longer from a facility that is the destination point G to a parking lot of the facility, after the vehicle 100 reaches the destination point G, the lost traveling determination unit 230 sets a target distance by which the vehicle 100 is separated from the destination point G, that is, the first distance L1C, to be longer than the normal distance L1. This reduces the possibility of an erroneous lost determination.

(5) The lost traveling determination unit 230 is arranged in the management center 200, which manages the traveling information of the vehicles 100 through wireless communication, to restart route guidance for the vehicle 100 that has been determined as being lost. This increases the flexibility and versatility even when adding a vehicle 100 that is subject to the determination of whether or not the vehicle 100 has not reached the destination point G and is lost.

Second Embodiment

A second embodiment of a navigation system will now be described with reference to the drawings. The second embodiment differs from the first embodiment in the processing mode for determining whether or not a vehicle is lost. Thus, the following description focuses on the configuration that differs from the first embodiment. The configuration that is the same as or corresponds to the first embodiment will not be described.

In the second embodiment, after a vehicle 100 reaches the destination point, the lost traveling determination unit 230 determines that the vehicle 100 has not reached a destination point and is lost. More specifically, after reaching the destination point, when the vehicle 100 moves away from the destination point, reaches a point separated by the first distance L1, returns from a returning point, and then moves toward the destination point by a predetermined third distance L3, the lost traveling determination unit 230 determines that the vehicle 100 has not reached the destination point and is lost. When the vehicle 100 is moved by the predetermined distance L3 from the returning point toward the destination point, the vehicle 100 has been returning after being moved away from the destination point G. Further, the vehicle 100 has been continuing to move toward the destination point G for a while. Thus, the lost traveling determination unit 230 assumes that the vehicle 100 is still continuing to travel toward the destination point G. In the second embodiment, the third distance L3 is shorter than the first distance L1.

Figure 6:
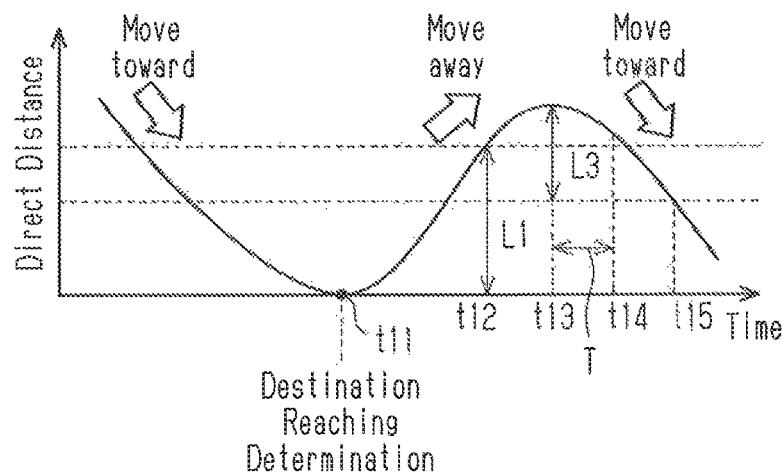
FIG. 6 is a graph showing an example of a condition for a lost determination for a vehicle that is detouring the vicinity of a destination point in a navigation system according to a second embodiment of the present invention.

As shown in FIG. 6, in the second embodiment, when the vehicle 100 reaches the destination point at time t11, the lost traveling determination unit 230 monitors whether or not the vehicle 100 travels to a point separated from the destination point by the first distance L1. When the vehicle 100 travels to a point separated from the destination point by the first distance L1 at time t12, the lost traveling determination unit 230 monitors whether or not the vehicle 100 is returning to the destination point. In this case, the lost traveling determination unit 230 monitors the transition of the distance between the vehicle 100 and the destination point. When the distance transitions from an increasing tendency to a decreasing tendency and the decreasing tendency lasts for a certain period, the lost traveling determination unit 230 determines that the vehicle 100 is returning toward the destination point. In the example of FIG. 6, the distance between the vehicle 100 and the destination point transitions from an increasing tendency to a decreasing tendency at time t13, and the decreasing tendency lasts for a certain period T or longer from time t13 to time t14. The lost traveling determination unit 230 accordingly determines that the vehicle 100 is returning toward the destination point. When determining that the vehicle 100 is returning toward the destination point, the lost traveling determination unit 230 monitors whether or not the vehicle 100 has been moved by the third distance L3 toward the destination point from the returning point. Subsequently, when the vehicle 100 is moved by the third distance L3 toward the destination point from the returning point at time t15, the lost traveling determination unit 230 accordingly determines that the vehicle 100 is lost.

Thus, the second embodiment has the advantage described below instead of advantage (2) of the first embodiment.

(2A) Even if the vehicle 100 has been moved away from the destination point G by the first distance L1, when the vehicle 100 is returned toward the destination point G and is moved by the third distance L3 toward the destination point G from the returning point, the lost traveling determination unit 230 determines that the vehicle 100 has not reached the destination point G and is lost. This allows the lost traveling determination unit 230 to determine that the vehicle 100 is lost when the vehicle 100 is still located far from the destination point G even if the vehicle 100 is returned from a point far from the destination point G and is moved toward the destination point G from the returning point. In the second embodiment, extension of the first distance L1 (L1*a*, L1*b*, or L1*c*) based on the examples of FIGS. 5A to 5C is effective.

Third Embodiment

A third embodiment of a navigation system will now be described with reference to the drawings. The navigation system provides detailed information of the vicinity of a destination point on a monitor of a vehicle when, after reaching the destination point, the vehicle repeatedly travels away from and toward the destination point. This differs from the first and second embodiments. The following description focuses on the configuration that differs from the first embodiment. The configuration that is the same as or corresponds to the first embodiment will not be described.

Figure 7:
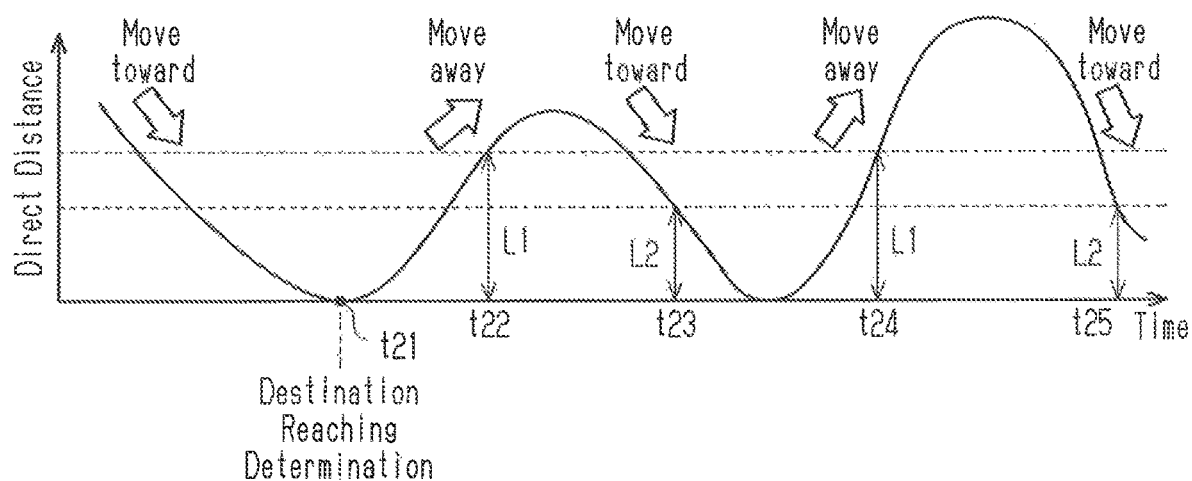
FIG. 7 is a graph showing an example of the transition of a distance between a traveling location and a destination point of a vehicle when a lost determination for a vehicle that is detouring the vicinity of the destination point in a navigation system according to a third embodiment of the present invention.

As shown in FIG. 7, when the vehicle 100 reaches the destination point at time t21, the lost traveling determination unit 230 monitors whether or not the vehicle 100 travels to a point separated from the destination point by the first distance L1. When the vehicle 100 has traveled to a point separated from the destination point by the first distance L1 at time t22, the lost traveling determination unit 230 monitors whether or not the vehicle 100 returns to a point separated from the destination point by the second distance L2.

When the vehicle 100 returns to a point separated from the destination point by the second distance L2 at time t23, the lost traveling determination unit 230 determines that the vehicle 100 is lost and monitors whether or not the vehicle 100 travels again to a point separated from the destination point by the first distance L1. When the vehicle 100 travels again to a point separated from the destination point by the first distance L1 at time t24, the lost traveling determination unit 230 monitors again whether or not the vehicle 100 returns to a point separated from the destination point by the second distance L2. Subsequently, when the vehicle 100 travels to a point separated from the destination point by the second distance L2 at time t25, the lost traveling determination unit 230 determines that the vehicle 100 is traveling toward the destination point again after moving away from the destination point of the vehicle 100 in a repeated manner.

When it is determined that the above traveling is repeated, the determination result is transmitted through wireless communication from the center communication unit 201 to the navigation device 110. When receiving the determination result from the center communication unit 201, the navigation device 110 displays the detailed information of the vicinity of the destination point and the information of the previous route guidance in different pictures on the monitor 106. In this case, with regard to images that display the detailed information of the vicinity of the destination point, the navigation device 110 may obtain any one of the images stored in the map information database 220 in advance. Alternatively, the navigation device 110 may obtain from the center an image that is captured by another vehicle with an in-vehicle camera and stored in the center. As another option, the navigation device 110 may obtain an image from the Internet through wireless communication.

Figure 8A:
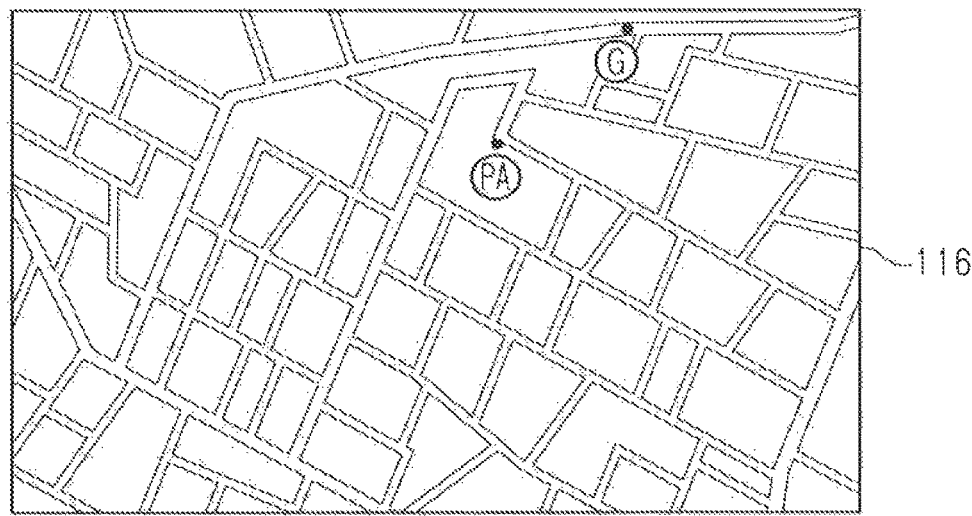
FIG. 8A is a schematic view showing an example of a setting mode of a monitor that displays map information of the vicinity of a vehicle in the navigation system of FIG. 7.
Figure 8B:
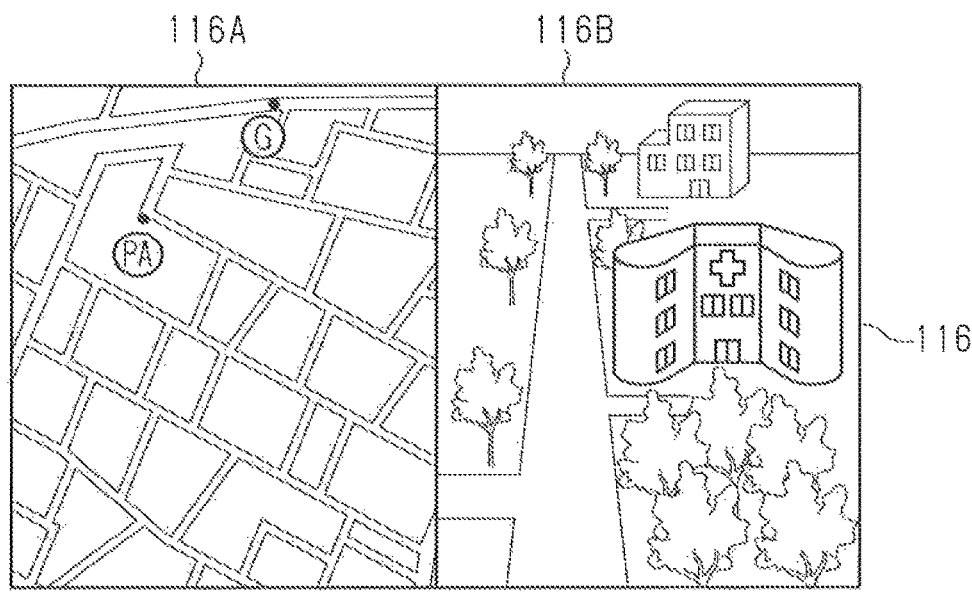
FIG. 8B is a schematic view showing an example of a setting mode of a monitor that displays image information (outer appearance information) of the vicinity of the destination point and the map information of the vicinity of the vehicle in the navigation system of FIG. 7.

More specifically, prior to time t25, which is when the repetition determination is made, for example, as shown in FIG. 8A, the navigation device 110 displays a full-screen image showing the map information of the vicinity of the vehicle 100 on the monitor 116. After time t25, as shown in FIG. 8B, the navigation device 110 divides the display region of the monitor 116 into a right screen and a left screen so that one divided region 116A displays an image showing the map information of the vicinity of the vehicle 100 and the other divided region 116B displays the image showing the outer appearance of the vicinity of the destination point.

Thus, the third embodiment has the advantage described below in addition to advantages (1) to (5) of the first and second embodiments.

(6) When repeatedly determining that the vehicle 100 has not reached the destination point G and is lost, the navigation device 110 displays on the monitor 116 the detailed information of the vicinity of the destination point G and the information of the preceding route guidance by, for example, setting a two-screen display of map information and image information. Thus, even when the driver of the vehicle 100 does not recognize the destination point G and is lost, guidance to the destination point G is further performed effectively. In the third embodiment, extension of the first distance L1 (L1a, L1b, or L1c) based on the examples of FIGS. 5A to 5C is effective.

Fourth Embodiment

A fourth embodiment of a navigation system will now be described with reference to the drawings. The fourth embodiment differs from the first to third embodiments in that the entire navigation system is installed in a single vehicle. Thus, the following description focuses on the configuration that differs from the first embodiment. The configuration that is the same as or corresponds to the first embodiment will not be described.

Figure 9:
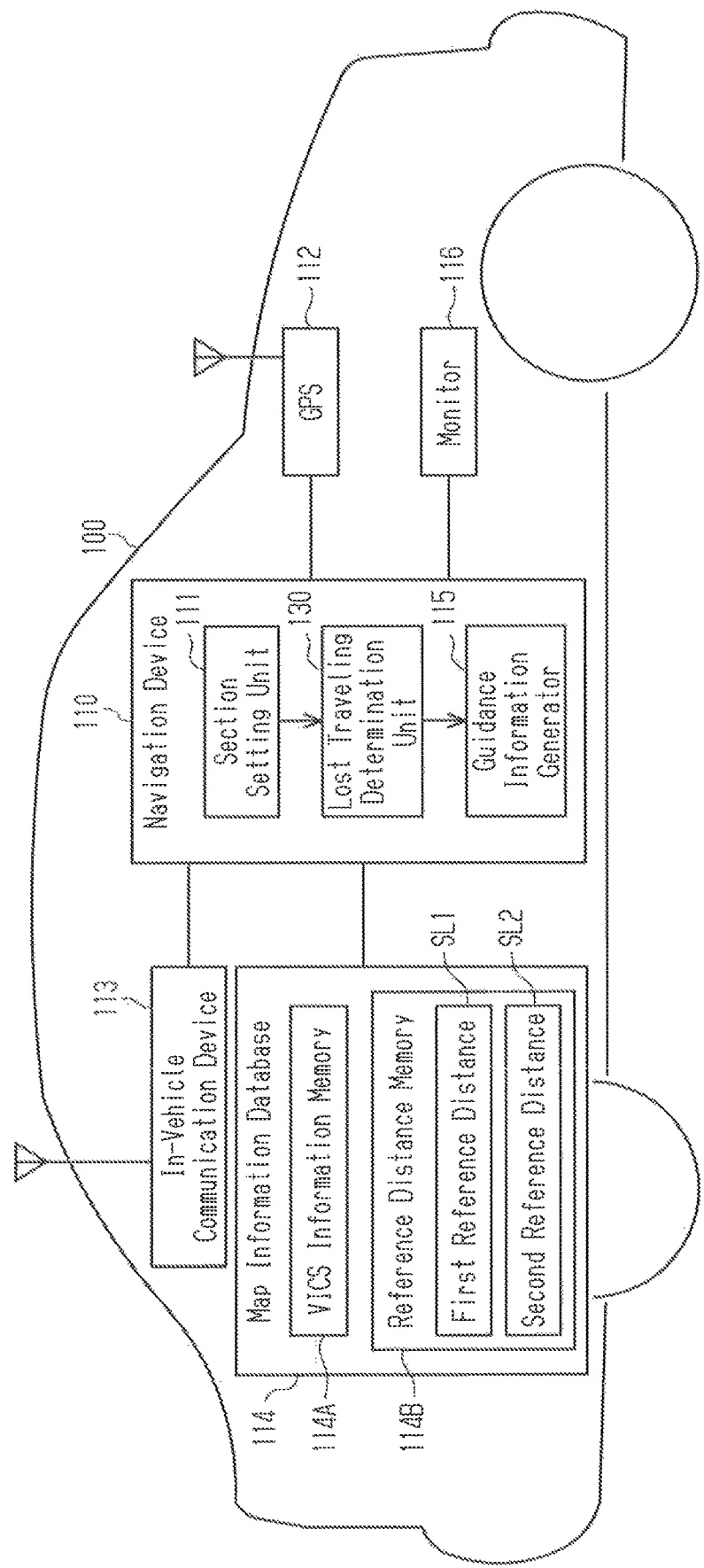
FIG. 9 is a schematic block diagram showing the configuration of a navigation system according to a fourth embodiment of the present invention.

As shown in FIG. 9, the navigation system of the fourth embodiment is installed in the vehicle 100. The navigation system determines whether or not, when a destination point for the vehicle 100 is set, the vehicle 100 has not reached the destination point and is lost.

The navigation device 110 includes a lost traveling determination unit 130 that functions in the navigation system to determine whether or not the vehicle 100 is lost. That is, the lost traveling determination unit 130 is installed in the vehicle. Further, the navigation device 110 is capable of obtaining VICS (trademark) information including information related to temporary traffic regulation from a VICS center via the in-vehicle communication device 113. The map information database 114 includes a VICS information, memory 114A. The latest information of the temporary traffic restriction obtained from the VICS center is occasionally written to and updated in the VICS information memory 214A. Further, the map information database 114 includes a reference distance memory 114B that stores the first reference distance SL1 and the second reference distance SL2.

Figure 10:
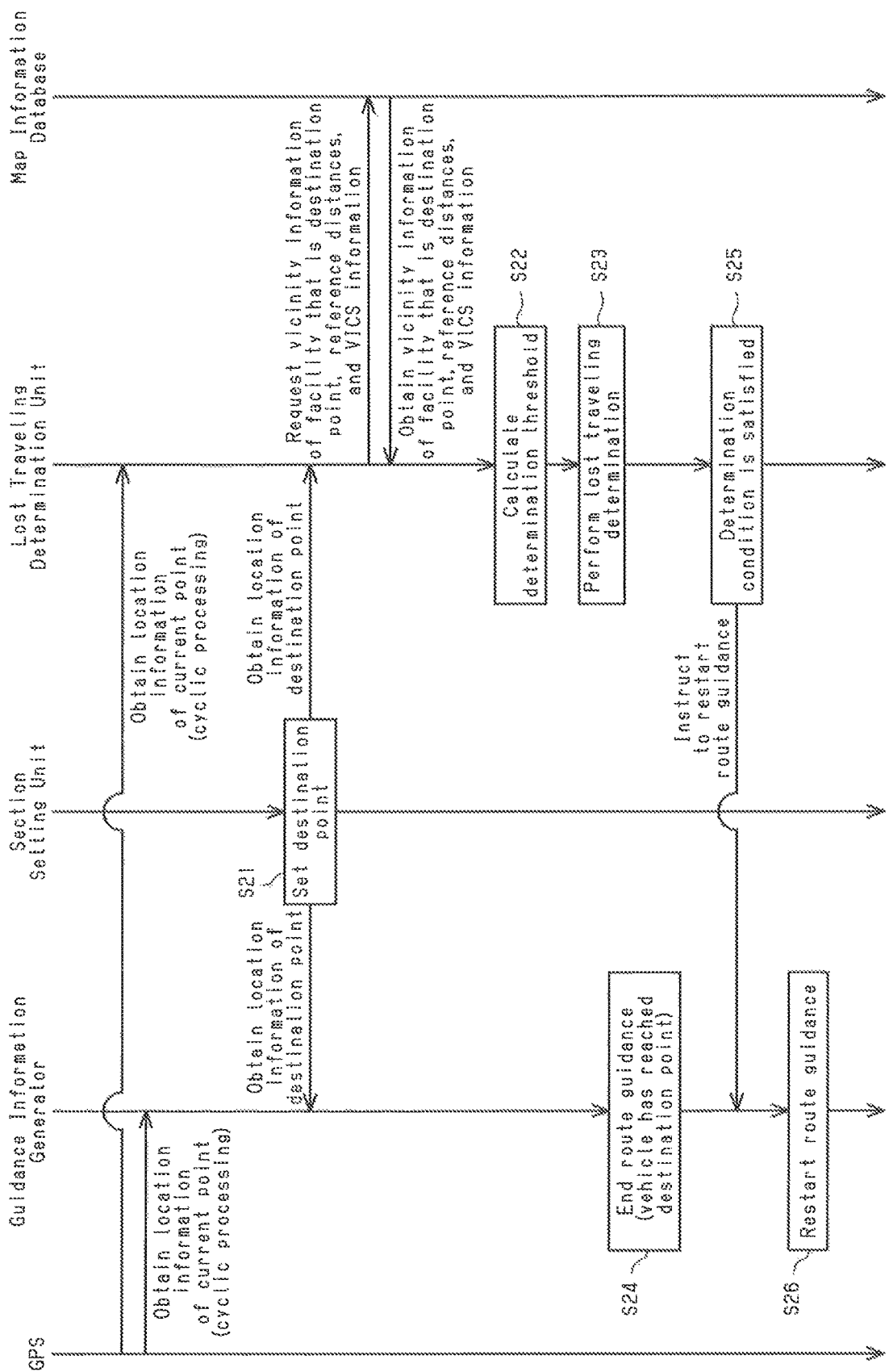
FIG. 10 is a sequence chart showing the flow of information when the navigation system of FIG. 9 performs a lost determination process.

In the fourth embodiment, as shown in FIG. 10, the lost traveling determination unit 130 uses the GPS 112 to cyclically obtain the location information of a current point of the vehicle 100, which is the current location information of the vehicle 100. Further, when the navigation device 110 sets a destination point of the vehicle 100 (step S21), the lost traveling determination unit 130 obtains the location information of the set destination point from the section setting unit 111. When obtaining the location information of the destination point of the vehicle 100, the lost traveling determination unit 130 accesses the map information database 114 to obtain vicinity information of a facility that is the destination point, information of the first reference distance SL1 and the second reference distance SL2, and VICS information including information related to temporary traffic restriction in the vicinity of the facility that is the destination point. Further, the lost traveling determination unit 130 calculates a determination threshold based on the obtained information (step S22).

The lost traveling determination unit 130 determines whether or not the vehicle 100 is lost using the location information of the current point and the destination point of the vehicle 100 and the determination threshold calculated based on the reference distances SL1 and SL2 (step S23). When the vehicle 100 has reached the destination point G while the lost traveling determination unit 130 is performing the determination process, the route guidance for the vehicle 100 performed by the guidance information generator 115 is ended (step S24). Subsequently, when the lost traveling determination unit 130 determines that the vehicle 100 is lost, that is, when the lost traveling determination unit 130 determines that the determination condition is satisfied (step S25), even if the route guidance performed by the guidance information generator 115 is ended when the vehicle 100 reaches the destination point, the lost traveling determination unit 130 has the guidance information generator 115 restart route guidance to the destination point (step S26).

Thus, the fourth embodiment has the advantage described below instead of advantage (5) of the first to third, embodiments.

(5A) The lost traveling determination unit 130 is installed in the vehicle 100 to restart route guidance for the corresponding vehicle that has been determined as being lost. Thus, since the vehicle 100 functions to determine whether or not the vehicle 100 has not reached the destination point G and is lost, the determination does not. require communication and the like between the vehicle 100 and an external device. Accordingly, although a load on the in-vehicle device increases, the determination is stably performed independently from, the communication environment between the vehicle 100 and an external device. In the fourth embodiment, extension of the first distance L1 (L1a, L1b, or L1c) based on the examples of FIGS. 5A to 5C is effective. Further, display of detailed information related to the vicinity of the destination point G based on the example of FIG. 8B is effective.

Other Embodiments

Each of the above embodiments may be modified as follows.

In the third embodiment, a map that enlarges the vicinity or the destination point may be used for the image showing detailed information of the vicinity of the destination point.

In each of the above embodiments, the destination may be a facility including a parking lot that requires the vehicle 100 to further travel for a predetermined distance or longer, and the vicinity of the destination may include a traffic-restricted road. In such a case, the lost traveling determination unit may set the first distance L1 to be longer than when the vicinity of the destination does not include a traffic-restricted road.

In the second embodiment, the lost traveling determination unit 230 may set the third distance L3 to be longer than or approximately equal to the first distance L1.

Each of the above embodiments may continue to calculate the optimal route from the current point of the vehicle 100 to the destination point after the vehicle 100 reaches the destination and ends the route guidance. In this case, the lost traveling determination unit may determine whether or not the vehicle 100 is lost by comparing the distance of the optimal route with a predetermined determination threshold.

In each of the first to third embodiments, the management center 200 may obtain statistical data of a traveling route when each of the vehicles 100 detours facilities. In this case, the lost traveling determination unit 230 may calculate the reference distances SL1 and SL2 for each facility based on the statistical data.

In each of the first to third embodiments, personal digital assistants, such as smartphones and tablet terminals, may manage the information such as a vehicle ID of the vehicle 100 that the user owns, and the personal digital assistants may be connected through wireless communication to the management center 200 so that information is communicable. In this case, the personal digital assistants may function in the navigation system to perform route guidance for the vehicle 100. When determining that the vehicle 100 is lost, the management center 200 restarts route guidance with the personal digital assistant owned by the user of the determined vehicle 100. Further, in the third embodiment, the management center 200 may output an image that shows detailed information of the vicinity of the destination point to the personal digital assistants and display the image on the personal digital assistants.

In the fourth embodiment, personal digital assistants, such as smartphones and tablet terminals, may be connected to the navigation device 110 through wired or wireless communication so that information is communicable. In this case, the personal digital assistants may function in the navigation system to perform route guidance for the vehicle 100. When determining that the vehicle 100 is lost, the management center 200 restarts route guidance with the personal digital assistant owned by the user of the determined vehicle 100.

In each of the above embodiments, after reaching the destination point, when the vehicle 100 moves away from the destination point G and then moves toward the destination point again, the lost traveling determination unit restarts route guidance by determining that the vehicle 100 has not reached the destination point and is lost. In this case, "after the vehicle reaches the destination point" refers to a time immediately after the vehicle reaches the destination point. Instead, the lost traveling determination unit may determine that the vehicle 100 has not reached the destination point and is lost when the vehicle 100 travels in the vicinity of the destination point for a while after reaching the destination point, moving away from the destination point, and then moving toward the destination point again. Thus, "after the vehicle reaches the destination point" may also refer to a time after a certain time elapses from when the vehicle reaches the destination point. Further, in each of the embodiments, when the vehicle 100 reaches a facility that is the destination point, the lost traveling determination unit determines that the vehicle 100 has reached the destination point. Instead, when the distance between the vehicle 100 and the facility that is the destination point is smaller than or equal to a predetermined distance, the lost traveling determination unit determines that the vehicle 100 has reached the destination point.

The invention claimed is:

1. A navigation system comprising:
a memory unit;
a navigation device configured to perform route guidance from a departure point to a destination point of a vehicle, the navigation device including:
a destination point setting unit configured to set the destination point of the vehicle,
a global positioning system (GPS) configured to obtain current location of the vehicle, and
a communication device configured to transmit the destination point and the current location of the vehicle to the memory unit; and
a lost determination unit configured to perform a lost determination after the vehicle reaches the destination point, the route guidance ends, and the vehicle moves away from the destination point and then moves toward the destination point again, the lost determination comprising restarting route guidance and determining that the vehicle is lost,
wherein the lost determination unit is configured to perform the lost determination based on a condition that the current location of the vehicle obtained by the global positioning system reaches a point separated from the destination point by a first distance having a first predetermined value, and then reaches a point separated from the destination point by a second distance having a second predetermined value, the first predetermined value being larger than the second predetermined value.

2. The navigation system according to claim 1, wherein the navigation system is configured to increase the first predetermined value when a vicinity of the destination point includes a road with a traffic restriction.

3. The navigation system according to claim 1, wherein the navigation system is configured to increase the first predetermined value when the destination point is a facility including a parking lot that requires the vehicle to further travel from the destination point for a travelling distance equal to or greater than a predetermined distance.

4. The navigation system according to claim 1, wherein
the vehicle further includes a display unit that is capable of separately displaying route guidance information in multiple screens, and
the display unit is configured to display, when the lost determination is repeated, detailed information related to a vicinity of the destination point together with the route guidance information.

5. The navigation system according to claim 1, further comprising:
a management center configured to manage traveling information of subject vehicles through wireless communication, wherein the lost determination unit is configured to be located in the management center and to restart route guidance for the vehicle that has been determined as being lost.

6. The navigation system according to claim 1, wherein the lost determination unit is configured to be arranged in the vehicle and to restart route guidance for the corresponding vehicle that has been determined as being lost.

7. A navigation system comprising:
- a memory unit;
- a navigation device configured to perform route guidance from a departure point to a destination point of a vehicle, the navigation device including:
  - a destination point setting unit configured to set the destination point of the vehicle,
  - a global positional system (GPS) configured to obtain current location of the vehicle, and
  - a communication device configured to transmit the destination point and the current location of the vehicle to the memory unit; and
- a lost determination unit configured to perform a lost determination after the vehicle reaches the destination point, the route guidance ends, and the vehicle moves away from the destination point and then moves toward the destination point again, the lost determination comprising restarting route guidance and determining that the vehicle is lost,
- wherein the lost determination unit is configured to perform the lost determination based on a condition that after reaching a returning point separated from the destination point by a first distance having a first predetermined value, and the current location of the vehicle obtained by the global positional system returns toward the destination point from the returning point by an other distance having an other predetermined value.

8. The navigation system according to claim 7, wherein the navigation system is configured to increase the first predetermined value when a vicinity of the destination point includes a road with a traffic restriction.

9. The navigation system according to claim 7, wherein the navigation system is configured to increase the first predetermined value when the destination point is a facility including a parking lot that requires the vehicle to further travel from the destination point for a travelling distance equal to or greater than a predetermined distance.

10. The navigation system according to claim 7, wherein
- the vehicle further includes a display unit that is capable of separately displaying route guidance information in multiple screens, and
- the display unit is configured to display, when the lost determination is repeated, detailed information related to a vicinity of the destination point together with the route guidance information.

11. The navigation system according to claim 7, further comprising:
- a management center configured to manage traveling information of subject vehicles through wireless communication, wherein the lost determination unit is configured to be located in the management center and to restart route guidance for the vehicle that has been determined as being lost.

12. The navigation system according to claim 7, wherein the lost determination unit is configured to be arranged in the vehicle and to restart route guidance for the corresponding vehicle that has been determined as being lost.

* * * * *